United States Patent
Egana et al.

[11] Patent Number: 6,155,164
[45] Date of Patent: Dec. 5, 2000

[54] JUICER

[75] Inventors: Carlos Egana, Maracay, Venezuela; Anthony Di Bitonto, New York; Marco C. Perry, Brooklyn, both of N.Y.

[73] Assignee: OrangeX Inc., New York, N.Y.

[21] Appl. No.: 09/227,378

[22] Filed: Jan. 8, 1999

[51] Int. Cl.⁷ .................. B30B 9/06; A47J 43/14
[52] U.S. Cl. .................. 100/125; D7/666; 99/508; 100/213; 100/283
[58] Field of Search .................. 110/110, 125, 110/131–135, 213, 283; D7/665, 666; 99/495, 506–508

[56] References Cited

U.S. PATENT DOCUMENTS

| | | | |
|---|---|---|---|
| D. 127,985 | 7/1941 | Zurawin | D7/666 |
| D. 130,573 | 12/1941 | Pleiss | D7/666 |
| D. 150,308 | 7/1948 | Mariani | 100/213 |
| D. 420,863 | 2/2000 | Egana et al. | D7/666 |
| 468,341 | 2/1892 | Harris | 100/213 |
| 665,988 | 1/1901 | Baumgarten | 100/213 |
| 1,958,570 | 5/1934 | Flegel | 100/125 |
| 2,109,653 | 3/1938 | Scurlock | 99/506 |
| 2,142,975 | 1/1939 | Majewski, Jr. | 100/131 |
| 2,526,258 | 10/1950 | Mitnick | 100/125 |
| 2,553,942 | 5/1951 | Roos | 100/125 |
| 2,589,724 | 3/1952 | Miller | 100/125 |
| 2,591,162 | 4/1952 | Kircher | 100/125 |
| 2,624,271 | 1/1953 | Johnson | 100/213 |
| 2,655,862 | 10/1953 | Mitnick | 100/125 |

FOREIGN PATENT DOCUMENTS

| | | | |
|---|---|---|---|
| 1196540 | 11/1959 | France | 100/213 |
| 1269612 | 7/1961 | France | 100/213 |
| 608406 | 9/1960 | Italy | 100/213 |

*Primary Examiner*—Stephen F. Gerrity
*Attorney, Agent, or Firm*—Stroock & Stroock & Lavan LLP

[57] ABSTRACT

A juicer for extracting the juice from a fruit includes a base having an upper platform having an aperture defined therethrough. A strainer assembly is provided on the upper platform. The juicer also includes a head that is movably disposed on the base and that has a cavity defined therein. The head is movable between a first position in which the head is proximate the strainer assembly, and a second position in which the head is away from the strainer assembly. Movement of the head between the first and second position is effected by a handle assembly that is connected to the base and to the head and that defines three pivot points that are arranged in generally vertically stacked relation with each other when the head is in the first position.

24 Claims, 4 Drawing Sheets

JUICER

BACKGROUND OF THE INVENTION

The present invention is directed to a juicer and, more particularly, to a fruit juicer having a shorter juicing stroke, an improved fit between the various components, an integral cup rest for holding a beverage receptacle, and a strainer that is less likely to clog during use and that facilitates juicing.

Manual (i.e., non-electric) fruit and vegetable juicing devices ("juicers") are known in the art. One such juicer is the Caribbean Ware™ juicer manufactured by OrangeX. This juicer includes a horseshoe-shaped base that supports a strainer assembly and that also supports a movable head. The strainer assembly typically includes a removable basket and a strainer insert which both rest in a cup fixedly mounted to the base. The basket and strainer are typically made from stainless steel using a relatively precise stamping process. The cup and base, on the other hand, are made from cast iron using a relatively imprecise casting process. Consequently, the fit achieved between the basket and strainer and the cup is loose and movement of the basket and strainer during use is common.

The horseshoe-shape of the prior art juicer bases provides a space within which a canister may be placed to receive juice from the juicer. The canister rests directly on the counter or table-top upon which the juicer is placed and typically is not used as a drinking receptacle. Consequently, the juice must be poured from the canister into a beverage receptacle for consumption. In addition, the squeezing process causes juice to splash out of the canister and in some cases, miss the canister completely thus resulting in a messy juicing process.

The strainers in prior art juicers typically have round holes disposed over the entire strainer. The size and location of the holes encourage clogging and provide for inefficient juicing. Furthermore, a straight handle is coupled to relatively long arms on either side of the juicer which when fully raised extends above the juicer to raise juicer head to provide a gap to insert the fruit. The handle is then moved in a substantially 180° arc to pull the juicer head down compressing the fruit.

These prior art devices have heretofore been satisfactory. However, they suffer from the disadvantage that first, precision manufacturing of a juicer is not possible using different materials such as stainless steel and cast iron, because of the different fabrication processes employed for the materials and the corresponding differences in manufacturing tolerances. To manufacture to such tolerances increases the cost and production time for making the juicer. Furthermore, prior art devices do not provide a drinking beverage rest that enables the user to place the drinking receptacle directly beneath the juicer to receive the juice directly into the glass and that also captures any spillage or excess juice produced during the juicing process. Further, prior art strainers frequently clog and do not efficiently extract the juice from the fruit or vegetable. Lastly, moving the handle through a 180° arc can cause fatigue to the operator.

Accordingly, a juicing device that overcomes the prior art shortcomings is desired.

SUMMARY OF THE INVENTION

A juicer is provided for extracting juice from the fruit which has a base, the base includes an upper platform having an arc aperture defined there through. A strainer assembly is positioned on the upper platform. A head is moveably disposed on the base and has a cavity defined therein. The head is moveable between a first position in which the head is proximate the strainer assembly and a second position in which the head is away from the strainer assembly. A handle assembly connected to the base and the head is defined by three pivot points that are arranged in a generally vertical stacked relationship with each other when the head is in the first position. The handle assembly is selectively moveable over a predetermined range to cause movement of the head between the first and second positions.

In a preferred embodiment, the head assembly includes a first cam pivotably connected to the head at the third pivot point. The handle is pivotably connected at the first pivot point to the base and at the second pivot point to the cam.

In a preferred embodiment the upper platform includes an aperture. The strainer assembly includes a basket. An insert is provided within the aperture for receiving the basket and positioning the basket within the aperture. A strainer is formed of tiered sections. All but the lowest section having a continuous (no apertures) surface while the lower section having apertures therein. Preferably the apertures are formed as vertical elongated openings extending along a height of the lowest (closest to the base) tier. A tip is provided at the top of the strainer for centering the fruit thereon.

Accordingly, it is an object of the present invention is to provide a juicer which shortens the stroke length of the squeezing activity.

A further object of the present invention is to provide a juicer which reconciles manufacturing tolerances between the strainer assembly and base.

A still further object of the present invention is to provide a juicer having a strainer which reduces pulping in the juice.

Yet another object of the invention is to provide a juicer that includes a base having a cup rest for positioning and holding a beverage receptacle in place and into which the juice may be directly dispensed.

Still other objects and advantages of the invention will in part be obvious and will in part be apparent from the specification and drawings.

The invention accordingly comprises the various embodiment and the relation of one or more of such embodiments with respect to each of the others thereof, which will be exemplified in the invention hereinafter disclosed, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENT

Figure 1:
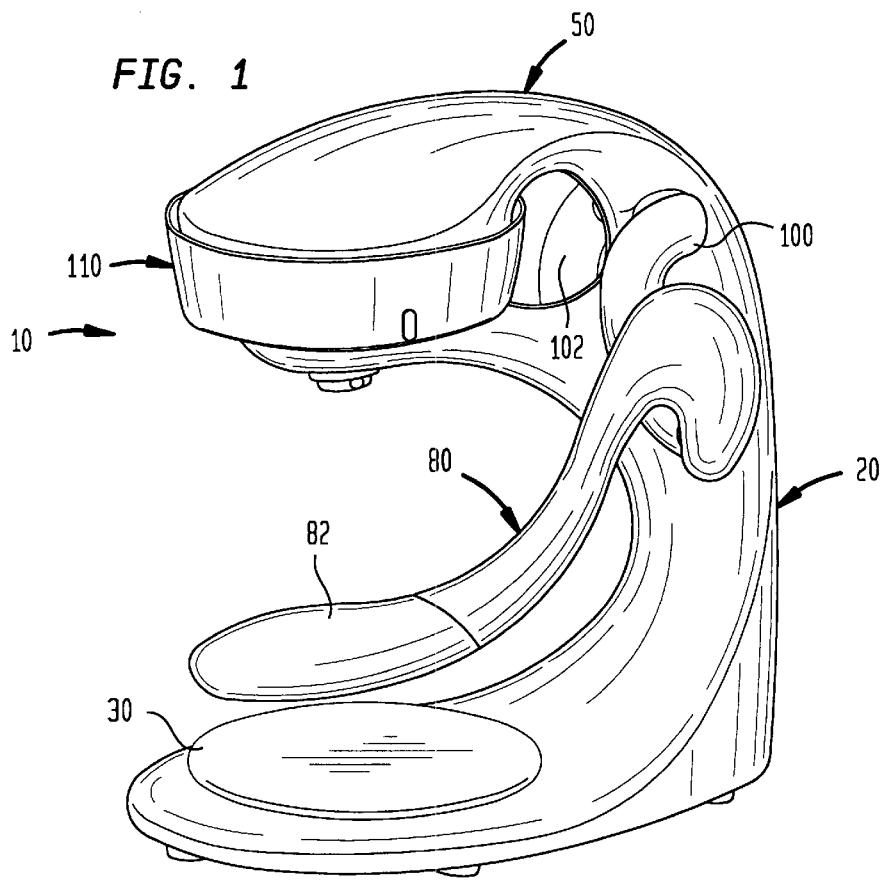
FIG. 1 is a perspective view of a juicer constructed in accordance with the present invention.

Reference is first made to FIGS. 1–4 in which a juicer, generally indicated as 10, constructed in accordance with the present invention is provided. Juicer 10 includes a base 20 having a generally solid lower platform 26 and an upper platform 28 having a recess 40 defined therein and a spout aperture 34 (see FIG. 5) defined therethrough. A cup rest 30 is removably affixed on the lower platform 26 and includes a recess 38 sized and a lip 39 (FIG. 4) shaped to capture juice spillage and to position a cup, tumbler, glass, or other beverage receptacle 60 beneath the spout aperture 34. Cup rest 30 is preferably made from a generally pliable or slip-resistant material such as rubber or SANTOPRENE™ brand material, for example. Slip-resistant feet 32 are provided on the base 20 to prevent movement of the juicer 10 during use and may be constructed from a pliable material such as rubber by way of example. A head guide channel 22 and a pivot hole 24 (FIG. 5) are formed in base 20 and extend through base 20 at substantially right angles to each other.

Figure 2:
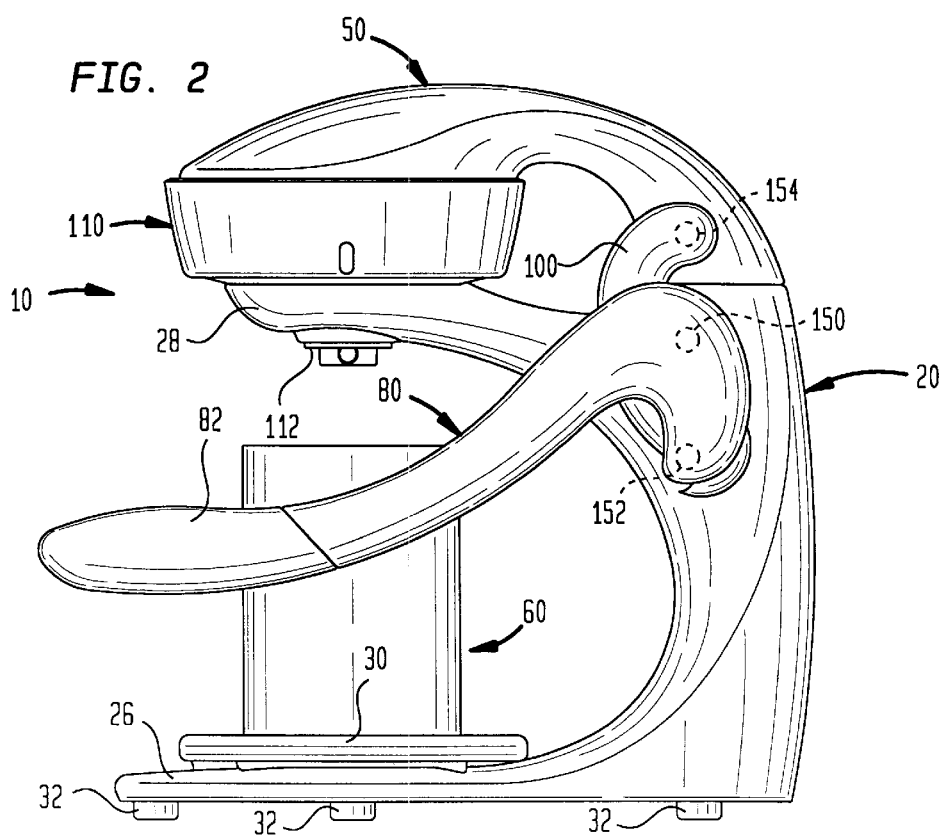
FIG. 2 is a side elevational view of a juicer constructed in accordance with the present invention.
Figure 4:
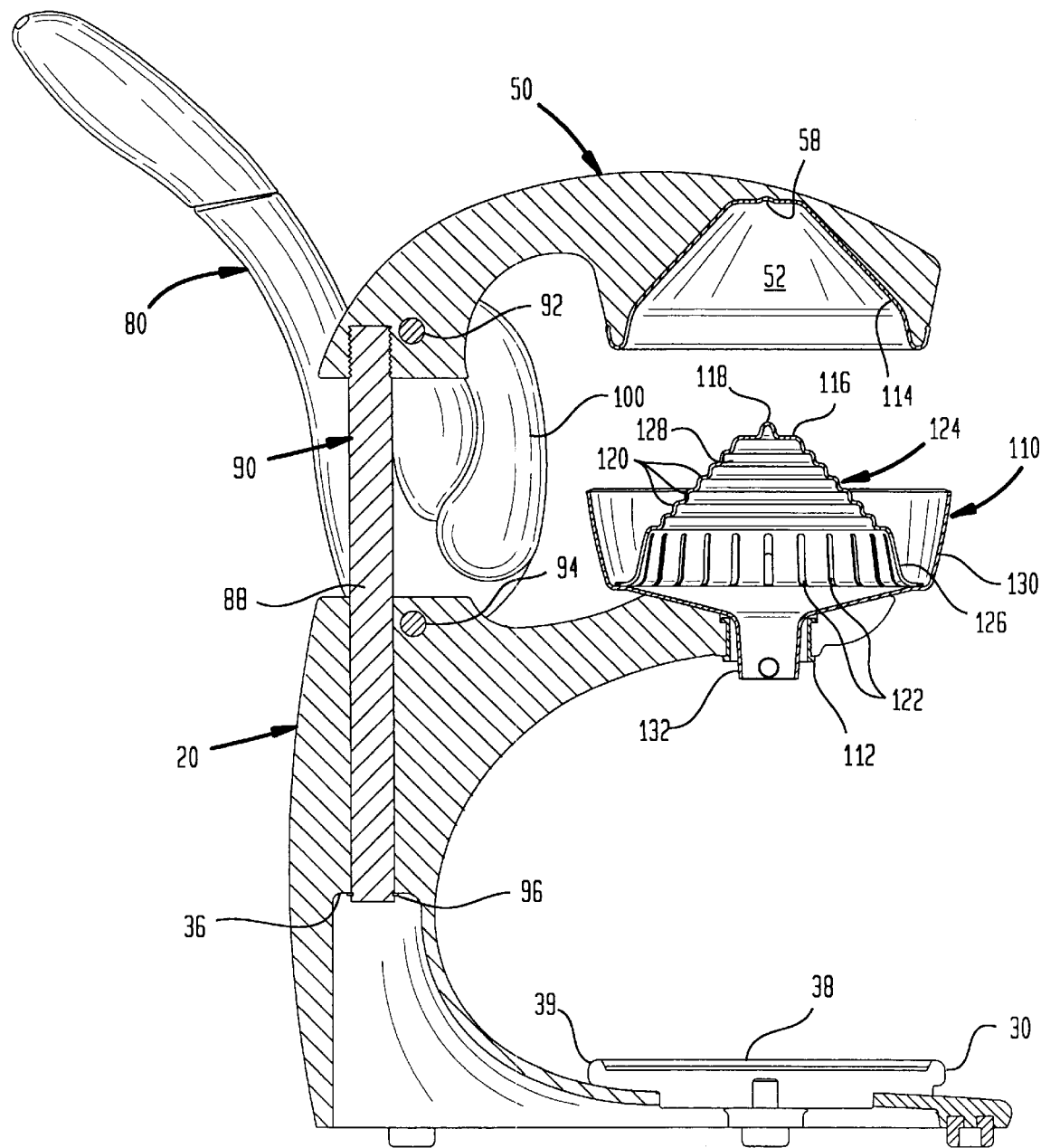
FIG. 4 is a cross-sectional view of the juicer taken along the line 4—4 of FIG. 3 depicting the juicer in an opened position.
Figure 5:
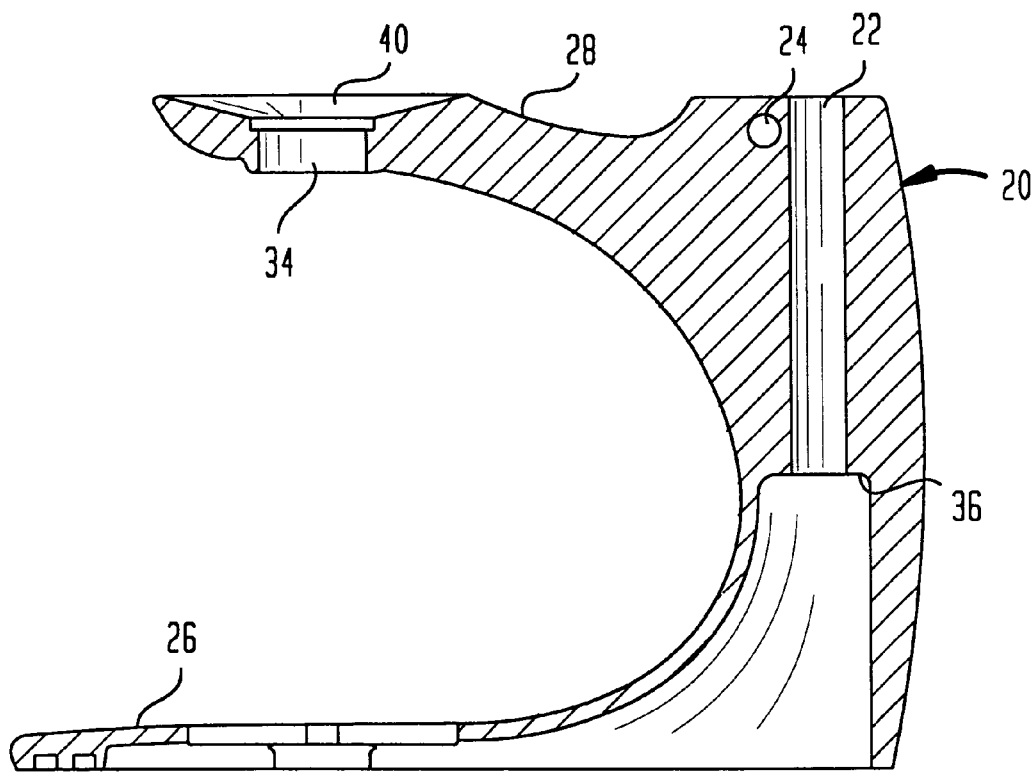
FIG. 5 is a cross-sectional view of the base of the juicer taken along the line 5—5 of FIG. 3, with certain details omitted for clarity.
Figure 6:
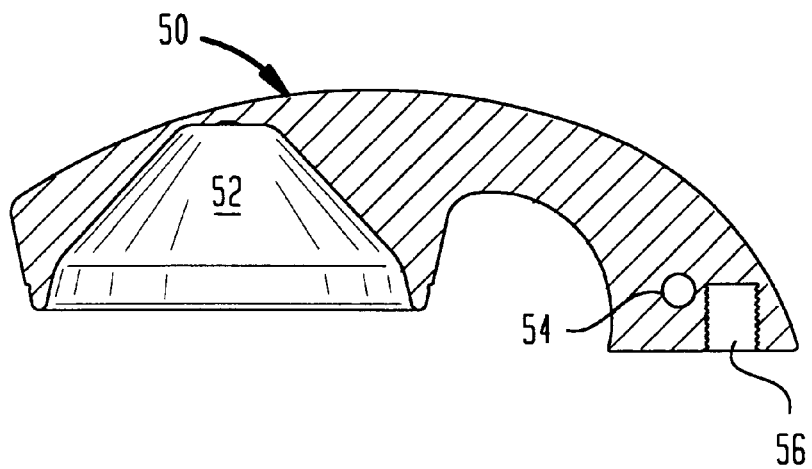
FIG. 6 is a cross-sectional view of the head of the juicer taken along the line 6—6 of FIG. 3, with certain details removed for clarity.

Juicer 10 also includes a head 50 that is slideably positioned on base 20 and that is selectively movable in a generally vertical direction between a first position and a second position closer to and away from base 20, respectively. When in the first position, as depicted in FIG. 2, head 50 is in abutting relation with the base 20 and proximate a strainer assembly 110. When in the second position, as depicted in FIG. 4, head 50 is out of the first position and in spaced-apart relation with the base 20. Movement of head 50 between the first and second positions is effected by a handle assembly 70 (described in detail below) coupled between head 50 and base 20. As depicted in FIG. 6, the head 50 has a generally conical cavity 52 defined therein and into which a cavity liner 114 (FIG. 4) is removably placed to provide a removable, sanitizable surface for contacting the fruit to be squeezed by the juicer 10. The cavity liner 114 may be completely disposable, i.e., disposable after each use, or it may be cleaned and sanitized (washable and reusable) after each use. The inner surface of the cavity liner 114 is generally planar and may include a detent 58 sized and shaped to match tip 118 of strainer 116 (as described in more detail below). In a preferred embodiment, the liner 114 is constructed of polypropylene.

Figure 3:
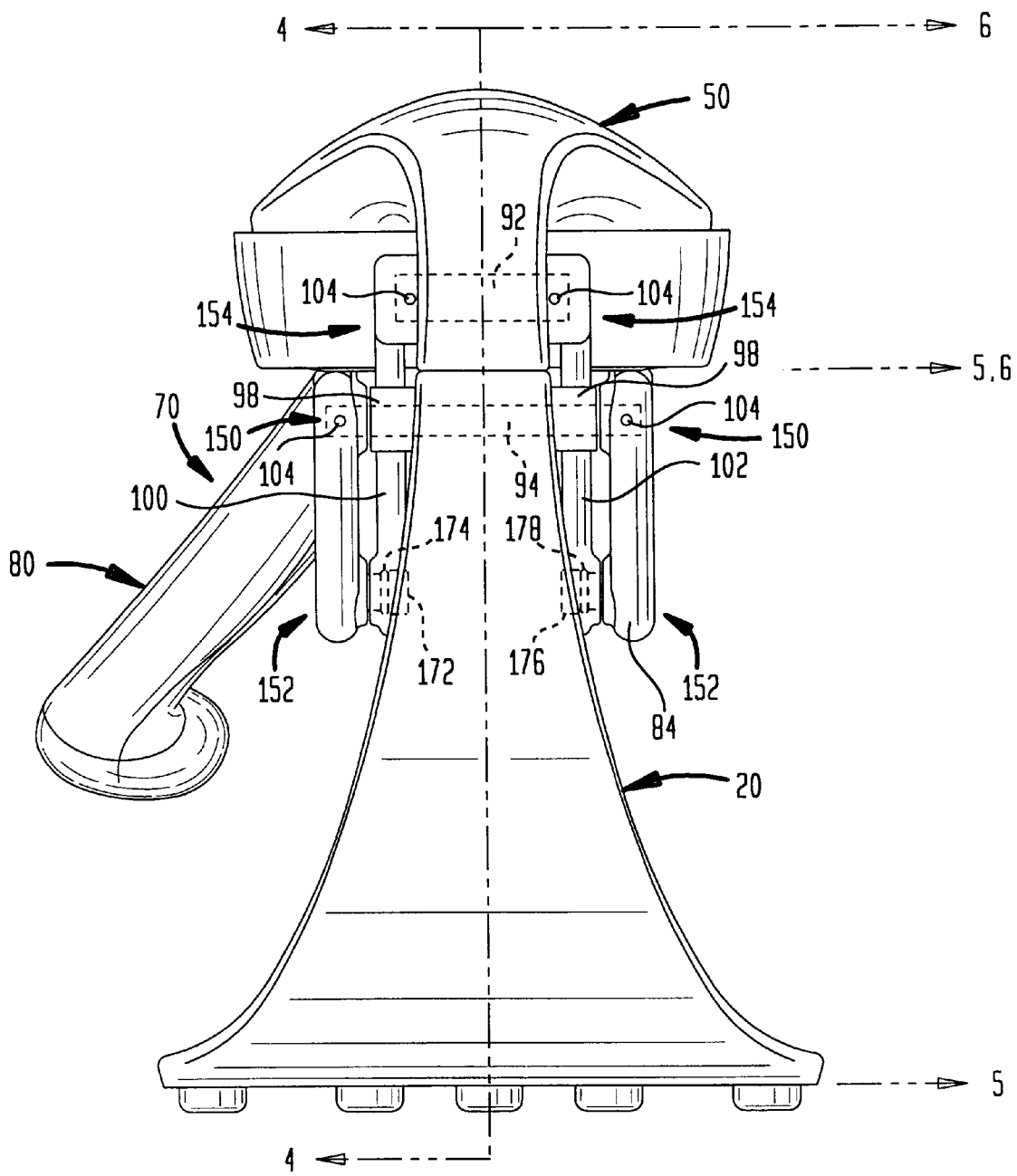
FIG. 3 is a rear elevational view of a juicer constructed in accordance with the present invention.

Referring to FIG. 3, the handle assembly 70 includes a handle 80 and first cam 100 pivotably connected with each other and with the base 20 and head 50, respectively. The interconnection among the handle assembly 70, base 20 and head 50 define three pivot points (150, 152, 154) that are arranged in generally vertically stacked relation with each other when the head is in the first position and that collectively effect movement of the head 50 between the first and second positions.

A handle shaft 94 passes through pivot hole 24 (see FIGS. 4 and 5) defined through the base 20. Handle 80 is connected to handle shaft 94 to provide the first pivot point. The first pivot point 150 defines the point about which the handle 80 is pivotably movable. Handle 80 and first cam 100 are pivotably connected together about a peg 172 extending through cam 100 and handle 80. Peg 172 extends outward from the handle 80 at the location of the second pivot point 152 and fits within a cavity (not shown) defined in an end of the first cam 100. A generally pliable retainer 174, such as an O-ring, for example, fits about the peg 172 and secures the peg 172 within the cavity and permits pivotable movement of the handle 80 and first cam 100 with respect to each other. A cam shaft 92 passes through an aperture 54 (see FIGS. 4 and 6) defined through head 50 and to which the first cam 100 is connected. This forms the third pivot point 154. The second and third pivot points 152, 154 are located at opposite ends of the first cam 100.

The handle assembly 70 may also include a handle crank 84 and second cam 102. The handle crank 84 and second cam 102 are located on a side of the juicer 10 opposite of the handle 80 and first cam 100 (see FIG. 3). The handle crank 84 is connected to the handle shaft 94 at the first pivot point 150. At an end of the handle crank 84 remote from the first pivot point 150, a peg 176 extends generally outward from the handle crank 84. The peg 176 is sized and shaped to fit within a cavity (not shown) defined in an end of the second cam 102. A generally pliable retainer 178 is provided about the peg 176 to secure the peg 178 within the cavity and to permit pivotable movement of the handle crank 84 and second cam 102 with respect to each other. Finally, the second cam 102 is connected to the cam shaft 92 so that handle crank 84 and second cam 102 are pivotably connected to each other and to the head 50, base 20, handle 80, and first cam 100 at points corresponding to the first, second and third pivot points 150, 152, 154. The second and third pivot points 152, 154 are located at opposite ends of the second cam 102.

The handle shaft 94 and cam shaft 92 are fixedly secured to the handle 80 and handle crank 84 and first cam 100 and second cam 102, respectively, by a dowel 104, or by other known bonding and affixation means and methods. Both shafts, however, move freely within their respective apertures. A collar 98 may be provided about the handle shaft 94 to present a finished and more aesthetically pleasing appearance.

Selective movement of the head 50 is effected through movement of the handle assembly 70, namely, through movement of the handle 80 and first cam 100. When moved, the handle 80 and handle crank 84 (when provided) pivot about first pivot point 150 causing the first cam 100 and second cam 102 (when provided) and second pivot point 152 to move generally upward (in FIG. 3). The upward movement of the second pivot point 152 follows a generally arcuate path, while the upward movement of the third pivot point 154 follows a substantially linear path. This movement also causes the first and second cams 100, 102 to pivot about the third pivot point 154. The head 50 is thus caused to move in a generally vertical direction out of its first position and into the second position as depicted in FIG. 4. When the head 50 is in the first position (FIG. 3), the handle 80 rests in a starting position in which it extends generally perpendicularly from the base 20. When the head 50 is in the second position (FIG. 4), the handle 80 is disposed generally parallel with the base 20 and is disposed approximately 150° from the handle starting position.

Referring next to FIG. 4, the general vertical movement of the head 50 between the first and second positions is further facilitated by a head guide shaft 90 that is fixedly connected at one end to the head 50. The head guide shaft 90 includes a body 88 that extends away from the head 50 and that freely passes through head guide channel 22 defined through the base 20. A retainer 96 is provided at an end of the shaft 90 longitudinally remote from the head 50. The retainer 96 encounters a lip 36 defined in the channel 22 to arrest movement of the head guide shaft 90 (and the head 50) when the head 50 is caused to move from the first position to the second position. Head guide shaft 90 is pulled up with head 50 and is forced to move vertically within head guide channel 22. This forces head 50 to move smoothly between the open and closed positions with precision.

In a preferred embodiment, handle 80 may be curved down and away from head 50. By curving the handle, a greater force is applied as the shoulder of the handle traces an arc through its movement given the same downward pushing force. Furthermore, because greater force is applied and because of the use of cam 100 it is only required that handle 80 pass through an arc of substantially 150° (see, e.g., FIGS. 2 and 4). Accordingly, the force applied by the user and overall torque applied by the user is decreased. Furthermore, although handle 80 is made from cast iron, in a preferred embodiment a gripping portion 82 formed of a resilient material such as rubber or other synthetic material is provided to provide comfort for the user as the user applies a force to the handle.

Juicer 10 includes a basket strainer assembly 110 that rests in recess 40 defined in the upper platform 28 of the base 20. The assembly 110 includes a basket 130 having a spout 132 extending through spout aperture 34 to position basket 130 on upper platform 28. The assembly also includes a strainer 116 that rests freely within the basket 130 and upon which a piece of fruit may be placed for juicing. The strainer 116 is generally conically shaped and includes a tiered upper section 124 having a generally continuous solid outer surface 128 and a lower section 126 having a plurality of apertures 122 defined therethrough to allow juice to pass to spout 132. The tiered upper section 124 interacts with the inside of the fruit to facilitate juice extraction during use of the juicer 10 (as described in more detail below). The tiered upper section 124 has no openings or apertures defined therethrough and may include a plurality of generally concentrically arranged ridges 120 that culminate at a tip 118 for centering and securing a fruit in place.

The apertures 122 defined through the lower section 126 are preferably generally vertically oriented elongate openings equidistantly spaced about the lower section 126. However, the openings 122 may alternatively comprise virtually any opening through which a liquid may pass (e.g., round, elliptical, rectangular, square, etc.) and may be spaced apart from each other in many configurations. Thus, the present invention may provide a strainer 116 having apertures 122 specifically constructed to produce a desired consistency drink. For example, larger apertures 122 may be provided for including the pulp or "meat" of the fruit in the drink. Alternatively, smaller apertures 122 may be provided if a "purer" drink (one comprised of mostly liquid with little or no pulp) is desired. However, the use of elongate vertical openings 122 which extend along the height of the bottom section 126 result in significantly reducing the amount of pulp passing through the strainer 116.

The strainer 116 is thus separated into an upper section 124 configured (i.e., with ridges 120) to extract the juice from the fruit or vegetable, and a lower section that is configured to permit the extracted juice to pass into the beverage receptacle 60. The present invention separates these two functions and thereby provides a juicer 10 that more efficiently extracts juice from the fruit and that reduces the instances of clogging from pulp during use.

A basket insert 112 is sized and shaped to fit securely within spout aperture 34 and to also provide a tension fit about spout 132 of basket 130 thereby holding spout 132 within spout aperture 34 and securing basket 130 in place on upper platform 28. The different materials from which the basket 130 and base 20 are constructed (stainless steel and cast iron, respectively) makes it difficult to ensure a precise fit between the components as manufactured; insert 112 thus provides an interface between the basket 130 and base 20 to ensure a secure and precise fit therebetween which accommodates different tolerances in manufacturing. Insert 112 is preferably constructed from a generally pliable material such as rubber, for example.

The base 20, head 50, handle 80, first and second cams 100, 102, and handle crank 84 are preferably constructed as generally unitary cast iron components. However, any of these components may be constructed of an alternative material (e.g., aluminum, plastic, composite, etc.), and they may be constructed of a plurality of separate component parts that are secured together. For example, the base 20 may comprise two asymmetrical halves that are secured together to provide the base 20. The head guide 90, cam shaft 92, handle shaft 94, strainer 116 and basket 130 are preferably constructed of stainless steel. These components may also be constructed of alternative materials, as a matter of design choice. Similarly, various components such as feet 32, cup rest 30, and basket insert 112 have been disclosed as being generally pliable. It will be obvious to persons skilled in the art that various materials may be used to provide the desired functionality for these component parts and that the precise material is not a limiting aspect of the present invention.

When not in use, the head 50 of the juicer 10 rests in the first position (see FIG. 3). Part of the head 50 is in abutting relation with the base 20 and another part of the head 50, that part within which the cavity 52 is defined, rests partly within the basket 130 of the strainer assembly 110. When in this position, the tip 118 of the strainer 116 is partly disposed within the detent 58 of the liner 114 and a gap (not shown) is defined between the liner 114 and strainer 116. The liner 114 is sized and shaped so that it substantially encompasses strainer 116 when the head 50 is in the first position. Handle 80 is disposed in a position substantially parallel with lower platform 26. When in the second position, as depicted in FIG. 4, handle 80 rotates to a second position substantially orthogonal to lower platform 26. The head 50 is spaced apart from the base 20 and the liner 114 and strainer 116 are also spaced apart from each other so that a piece of fruit may be placed upon the strainer 116.

In operation, a user opens juicer 10 by moving the handle 80 in a generally upward direction thereby causing the head 50 guided by shaft 90, to move out of the first position to the second position. Movement of the head 50 and handle 80 will be stopped when retainer 96 encounters lip 36 within the head guide channel 22. A piece of fruit may then be placed upon the strainer 116, ensuring that the tip 118 is approximately located in the center of the fruit to position the fruit thereon for centering relative to strainer 116. Head 50 is then caused to move from the second position to the first position by drawing the handle 80 generally downward and toward the user. As the handle 80 is moved thusly, the cavity liner 114 contacts the sample as the head 50 compresses the sample first onto tip 118 to pierce the fruit and then onto ridges 120 of the strainer 116. As the sample is being compressed, the ridges 120 defined about the upper section 124 of the strainer 116 abrasively engage the inside of the sample, further facilitating juice extraction therefrom. Juice extracted from the sample passes through the apertures 122, exits the basket 130 through the spout 132, and passes directly into the beverage receptacle 60 provided on the cup rest 30 below. Excess juice or spillage is contained by lip 39 of cup rest 30. The configuration of the apertures 122 will determine the consistency of the beverage dispensed by the juicer 10.

The juicer 10 of the present invention provides a more compact and efficient way to extract juice from a fruit. The unique design of the base 20, head 50, handle 80 and cams 100, 102, provide a device that delivers greater juicing torque with a shorter range of handle movement and with less exertion by the user.

It will thus be seen that the objects set forth above, among those made apparent from the preceding description, are efficiently attained and, since certain changes may be made in carrying out the above device without departing from the spirit and scope of the invention, it is intended that all matter contained in the above description shall be interpreted as illustrative and not in a limiting way.

It also to be understood that the following claims are intended to cover all the generic and specific features of the invention herein described and all statements of the scope of the invention which, as a matter of language might be said to fall therebetween.

What is claimed is:

1. A juicer for extracting the juice from a fruit comprising:
    a base having an upper platform having an aperture defined therethrough;
    a strainer assembly positioned on said upper platform;
    a head disposed on said base and having a cavity defined therein, said head being movable between a first position in which said head is proximate said strainer assembly, and a second position in which said head is away from said strainer assembly; and
    a handle assembly connected to said base and to said head and defining first, second, and third pivot points that are arranged in generally vertically stacked relation with each other when said head is in said first position, said handle assembly being connected to said base at said first pivot point and to said head at said second pivot point and being selectively movable over a predetermined range to cause movement of said head between said first and said second positions, said first pivot point being closer to said third pivot point when said head is in said first position than when said head is in said second position.

2. The juicer of claim 1, wherein said handle assembly further comprises:
    a first cam pivotably connected to said head at said third pivot point; and
    a handle pivotably connected at said first pivot point to said base and at said second pivot point to an end of said first cam remote from said third pivot point.

3. The juicer of claim 2, wherein said handle further comprises a pliable grip.

4. The juicer of claim 2, wherein said handle assembly further comprises:
    a second cam pivotably connected to said first cam through said head; and
    a handle crank pivotably connected at said first pivot point to said handle through said base and at a position corresponding to said second pivot point to an end of said second cam remote from said third pivot point;
    said second cam and said handle crank being selectively movable by said handle to cause movement of said head between said first and said second positions.

5. The juicer of claim 2, wherein said predetermined movement range of said handle assembly is defined by a starting position in which said handle extends generally perpendicularly outward from said base, and an ending position in which said handle is displaced approximately 90° from said starting position.

6. The juicer of claim 2, wherein said handle is curved.

7. The juicer of claim 1, further comprising a vertical guide, affixed to said head and slideably disposed within said base to move within said base in a substantially vertical direction.

8. The juicer of claim 7, wherein said base has a generally vertical guide channel defined therein, said vertical guide comprising a head guide shaft fixedly mounted to said head and having a body that extends away from said head and that slidingly passes through said vertical guide channel, said vertical guide channel and said head guide shaft cooperatively guiding said head as it is moved between said first and said second positions.

9. The juicer of claim 1, wherein said strainer assembly further comprises a basket carrying a strainer and having a spout that passes through said aperture defined in said upper platform.

10. The juicer of claim 9, further comprising an insert disposed within said aperture and receiving and positioning said spout within said aperture.

11. The juicer of claim 10, wherein said insert forms a tension fit with said spout.

12. The juicer of claim 9, wherein said basket is constructed of stainless steel.

13. The juicer of claim 1, wherein said base further comprises a lower platform and a cup rest affixed to said lower platform.

14. The juicer of claim 13, wherein said cup rest is removable from said lower platform and has a recess defined therein that is sized and shaped to secure a beverage receptacle in place on said lower platform beneath said spout.

15. The juicer of claim 13, wherein said cup rest includes a lip.

16. The juicer of claim 13, wherein said cup rest is constructed of a generally pliable material.

17. The juicer of claim 1, wherein said strainer assembly includes a strainer having a generally conical shape and includes a tiered upper section having a continuous outer surface and a bottom section having a plurality of apertures defined therethrough.

18. The juicer of claim 17, wherein said upper section has a plurality of concentric ridges defined thereon.

19. The juicer of claim 17, wherein said apertures are vertically extending elongate openings.

20. The juicer of claim 17, wherein said upper section includes a tip for centering and securing a fruit in place relative to said base.

21. The juicer of claim 17, wherein said strainer is constructed of stainless steel.

22. The juicer of claim 1, wherein said head is formed as a unitary construction formed of cast iron.

23. The juicer of claim 1, wherein said base is formed as a unitary construction formed of cast iron.

24. The juicer of claim 1, further comprising a cavity liner removeably disposed within said cavity defined in said head, said cavity liner being at least partly disposed within said strainer assembly when said head is in said first position.

* * * * *